(12) United States Patent
Zhao et al.

(10) Patent No.: US 12,545,090 B2
(45) Date of Patent: Feb. 10, 2026

(54) DRIVE SYSTEM FOR VEHICLE, AND VEHICLE

(71) Applicant: Valeo eAutomotive Germany GmbH, Erlangen (DE)

(72) Inventors: Wanchao Zhao, Erlangen (DE); Yejin Jin, Erlangen (DE); Yue Li, Erlangen (DE); Yawei Sun, Erlangen (DE); Dongdong Wang, Erlangen (DE); Xiaoxue Deng, Erlangen (DE); Lefan Feng, Erlangen (DE); Zhichao Chu, Erlangen (DE); Xucan Chen, Erlangen (DE); Yifan Gu, Erlangen (DE); Shu Zhang, Erlangen (DE)

(73) Assignee: Valeo eAutomotive Germany GmbH, Erlangen (DE)

( * ) Notice: Subject to any disclaimer, the term of this patent is extended or adjusted under 35 U.S.C. 154(b) by 0 days.

(21) Appl. No.: 18/971,095

(22) Filed: Dec. 6, 2024

(65) Prior Publication Data

US 2025/0187415 A1 Jun. 12, 2025

(30) Foreign Application Priority Data

Dec. 7, 2023 (CN) .......................... 202311679526.2

(51) Int. Cl.
| | |
|---|---|
| *B60K 1/00* | (2006.01) |
| *B60L 53/16* | (2019.01) |
| *B60R 16/02* | (2006.01) |
| *F16H 57/029* | (2012.01) |
| *F16H 57/031* | (2012.01) |

(Continued)

(52) U.S. Cl.
CPC ................ *B60K 1/00* (2013.01); *B60L 53/16* (2019.02); *B60R 16/0207* (2013.01); *F16H 57/029* (2013.01); *F16H 57/031* (2013.01); *F16H 63/3425* (2013.01);

(Continued)

(58) Field of Classification Search
CPC ................. F16H 63/3458–3475; B60T 13/746
See application file for complete search history.

(56) References Cited

U.S. PATENT DOCUMENTS

| 8,523,576 B2 * | 9/2013 | Heien ....................... B60L 3/04 |
| | | 439/34 |
| 10,407,041 B2 * | 9/2019 | Heubner ............. F16H 63/3441 |

(Continued)

FOREIGN PATENT DOCUMENTS

| CN | 105827060 A | 8/2016 |
| CN | 112555407 A | 3/2021 |

(Continued)

OTHER PUBLICATIONS

European Communication pursuant to Article 94(3) EPC issued May 16, 2025, in corresponding European Patent Application No. 24 218 446.3, 7 pages.

*Primary Examiner* — Thomas C Diaz
(74) *Attorney, Agent, or Firm* — Oblon, McClelland, Maier & Neustadt, L.L.P.

(57) ABSTRACT

A drive system for a vehicle, and a vehicle. The drive system includes a housing, containing an electric motor of the drive system, and a cover fixed to the housing and formed with a cavity accommodating a transmission of the drive system A boost connector passes through the cover and extending into the housing, and is electrically connected to an electrical connector of the electric motor.

18 Claims, 2 Drawing Sheets

(51) Int. Cl.
*F16H 63/34* (2006.01)
*F16H 57/02* (2012.01)

(52) U.S. Cl.
CPC .............. *F16H 2057/02026* (2013.01); *F16H 2057/02034* (2013.01); *F16H 2057/02043* (2013.01)

(56) References Cited

U.S. PATENT DOCUMENTS

| | | | |
|---|---|---|---|
| 11,761,527 B2 * | 9/2023 | Fürstenhöfer | F16H 57/02 74/606 R |
| 2010/0255686 A1 * | 10/2010 | Doo | H01R 13/2421 310/71 |
| 2014/0306563 A1 * | 10/2014 | Oyama | H02K 11/02 310/71 |
| 2014/0374139 A1 * | 12/2014 | Akahori | B60R 16/0238 174/135 |
| 2017/0237312 A1 | 8/2017 | Stewart et al. | |
| 2023/0001793 A1 | 1/2023 | Fürstenhöfer et al. | |

FOREIGN PATENT DOCUMENTS

| | | | |
|---|---|---|---|
| CN | 114094746 A | 2/2022 | |
| CN | 115570995 A | 1/2023 | |
| CN | 116461445 A | 7/2023 | |
| DE | 10 2012 200 488 A1 | 3/2013 | |
| DE | 10 2021 130 767 A1 | 5/2023 | |
| JP | 4926019 B2 * | 5/2012 | ............ Y02E 60/50 |
| KR | 10-2015-0053459 A | 5/2015 | |
| WO | WO 2016/110519 A1 | 7/2016 | |
| WO | WO 2023/061800 A1 | 4/2023 | |

* cited by examiner

DRIVE SYSTEM FOR VEHICLE, AND VEHICLE

TECHNICAL FIELD

The present disclosure relates to a drive system for a vehicle, and a vehicle.

BACKGROUND

Developments in science and technology coupled with technical progress have resulted in changes in automotive products with each passing day, and this has placed higher requirements on circuit connector products. In a new energy vehicle, a boost connector may be installed on an electric drive system, being used to electrically connect an external power source and an all-in-one product or electric motor of the electric drive system, for example to achieve boost charging of a battery. In a high-voltage, high-current environment, well-sealed and reliable power distribution and conduction are critical to the safety of the new energy vehicle as a whole. In an existing technical solution, a boost connector is generally installed at the non-drive end of the electric motor, in a position which is quite remote from an electrical connector of the electric motor; a larger space is needed to provide a protective component, resulting in an increase in the volume of the electric drive system. If installed at the drive end of the electric motor, the boost connector will need to pass through the transmission for connection to the electrical connector of the electric motor, and the position of the electrical connector and the parking lock mechanism in the transmission will make it difficult to find a suitable position to install the boost connector.

Thus, there is a need for an electric drive system capable of solving the abovementioned problems.

SUMMARY OF THE INVENTION

Thus, an objective of the present disclosure is to provide a drive system for a vehicle, and a vehicle, wherein a boost connector of the drive system is arranged at a drive end of an electric motor, being structurally compact, convenient to install, well-sealed and highly reliable.

The abovementioned objective is achieved through a drive system for a vehicle, and a vehicle, which are described below.

The present disclosure provides a drive system for a vehicle, the drive system comprising: a housing, containing an electric motor of the drive system; a cover, fixed to the housing and formed with a cavity accommodating a transmission of the drive system; and a boost connector, passing through the cover and extending into the housing, and electrically connected to an electrical connector of the electric motor.

Thus, the boost connector of the present disclosure is installed at the drive end of the electric motor, closer to the electrical connector of the electric motor, thus making the structure more compact.

The drive system according to the present disclosure may also have one or more of the following features, individually or in combination.

In one embodiment, the drive system further comprises a positioning shaft for positioning a pawl of a parking lock mechanism of the transmission, the positioning shaft being hollow and extending through a drive end wall of the housing, wherein the boost connector extends from one end of the hollow positioning shaft through the positioning shaft into the housing.

In this way, the present disclosure can use an existing structure to install the boost connector, so saves space and simplifies installation; moreover, the hollow shaft can be used to provide protection for the boost connector, thus improving reliability. In addition, this type of installation has little impact on the layout of the existing structure; in particular, it has no impact at all on the layout of the parking lock mechanism of the transmission.

In an embodiment, the boost connector comprises a connection seat and a cable fixed to the connection seat, the connection seat being fixed to the cover by a first fastener, and the cable extending through the connection seat.

By means of the connection seat, the boost connector can be fixed to the transmission cover, and a certain degree of protection can be provided for the cable.

In an embodiment, the cover is provided with an installation hole, the connection seat being fixed in the installation hole, and a first sealing member is arranged between the connection seat and a hole wall of the installation hole.

In an embodiment, the first sealing member comprises multiple sealing rings distributed in an extension direction of the cable.

In this way, a good sealing effect can be achieved, and the extension of the boost connector through the cover and the housing from the electric motor drive side will not affect the sealing of the drive system.

In an embodiment, the connection seat comprises a flange, the first fastener passing through the flange and being fixed to the cover.

In an embodiment, a first end of the cable is electrically connected to a power source, and a second end extends into the housing and is electrically connected to the electrical connector of the electric motor via a wiring terminal.

In an embodiment, an installation window is provided on a peripheral side wall of the housing, and a second fastener is used to fix the wiring terminal to the electrical connector through the installation window.

In an embodiment, the drive system further comprises an installation cover for closing the installation window.

In an embodiment, the drive system further comprises a second sealing member, arranged between the installation cover and the installation window.

The present disclosure further provides a vehicle, comprising the drive system described above.

BRIEF DESCRIPTION OF THE DRAWINGS

A better understanding of the advantages and objective of the present disclosure can be gained from the preferred embodiments of the present disclosure described in detail below with reference to the drawings. To better illustrate the relationships among components in the drawings, the drawings are not drawn to scale. In the drawings.

EMBODIMENTS OF THE INVENTION

Figure 1:
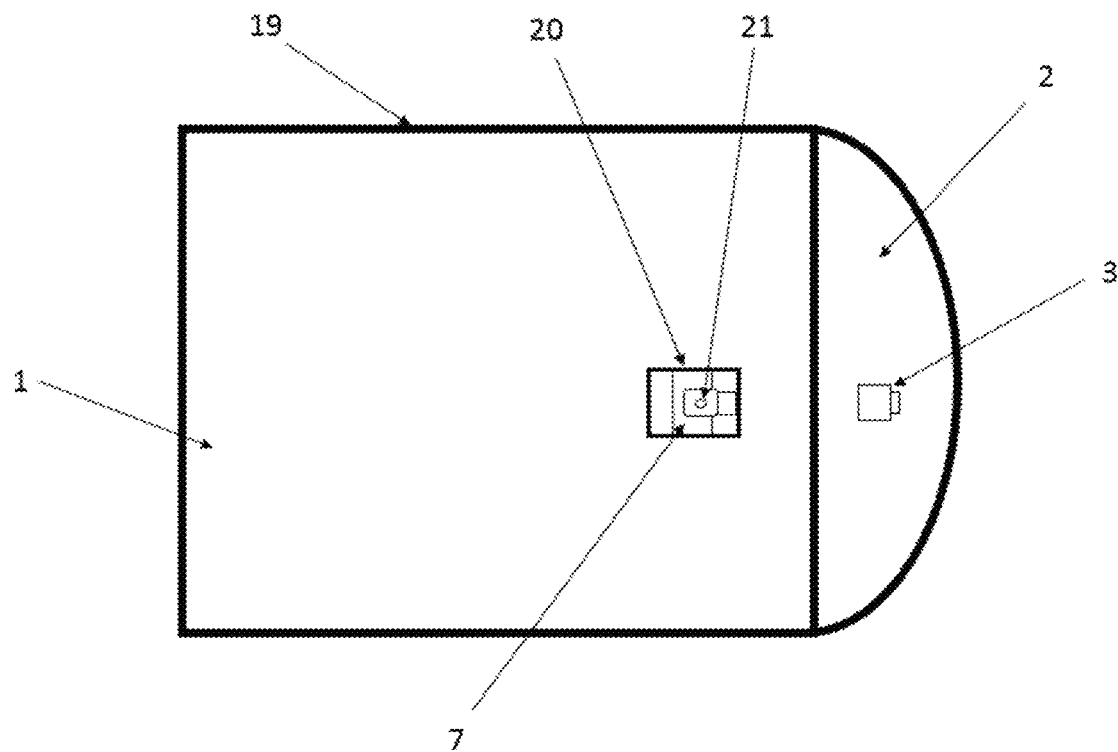
FIG. 1 shows a highly schematic drawing of a drive system for a vehicle according to an embodiment of the present disclosure.

In order to clarify the technical solution and its objective and advantages of the present disclosure, the technical solutions of embodiments of the present disclosure are described clearly and completely below in conjunction with the drawings of particular embodiments of the present disclosure. In the drawings, identical reference numerals denote identical components. It must be explained that the embodiments described are some, not all, of the embodiments of the present disclosure. All other embodiments obtained by those skilled in the art based on the described embodiments of the present disclosure without the need for inventive effort shall fall within the scope of protection of the present disclosure.

Unless otherwise defined, the technical or scientific terms used herein shall have the common meanings understood by those skilled in the art. The words "first", "second", and the like used in the description and claims of the patent application disclosed herein do not indicate any order, quantity or importance, being merely used to distinguish different component parts. Likewise, words such as "a" or "one" do not necessarily represent a quantity limit. Words such as "comprising", "including" or "having" mean that the element or object preceding the word covers the elements or objects and equivalents thereof listed after the word, without excluding other elements or objects. Words such as "connection" or "communication", rather than being limited to the physical or mechanical connection or communication shown in a drawing, may include connection or communication equivalent thereto, irrespective of whether it is direct or indirect. "Upper", "lower", "left", "right", etc. are only used to indicate a relative positional relationship, and when the absolute position of a described object changes, the relative positional relationship may also change accordingly.

A drive system of a vehicle generally comprises an electric motor, a speed reducer and a power electronics unit. The electric motor converts inputted electrical energy to rotational mechanical energy; the speed reducer is mechanically coupled to the electric motor, adjusts the speed of rotation and the torque generated by the electric motor, and then transmits same to wheels of the vehicle. The power electronics unit may comprise at least one of an inverter, an on-board charger and a DC-DC converter. The inverter can be used to invert DC outputted by an electrical energy storage means (e.g. a battery or another electrical energy storage means) to AC capable of driving the electric motor; the on-board charger can charge the electrical energy storage means when the vehicle is recovering energy; and the DC-DC converter can convert high-voltage DC outputted by the electrical energy storage means to low-voltage DC suitable for use in a low-voltage system of the vehicle. The electric motor and the speed reducer in the drive system are generally arranged adjacent to each other, to facilitate mechanical coupling therebetween.

Various embodiments of the present disclosure will be described in detail below with reference to FIGS. 1 to 3.

Part of a drive system comprised in a vehicle according to the present disclosure is shown in FIG. 1. The drive system may comprise a housing 1, a cover 2 and a boost connector 3. FIG. 1 merely shows the drive system in highly schematic form, in which the shapes and sizes, etc. of the various parts are not representative of the actual situation. In addition, as shown in FIG. 2, an electric motor 4 of the drive system is arranged inside the substantially cylindrical housing 1, and has an electrical connector 7. For example, the electrical connector 7 takes the form of a busbar, located at a drive side of the electric motor 4. As shown in FIG. 1, the cover 2 is fixed to the housing 1; specifically, the cover is fixed to the housing 1 at a drive end of the electric motor. As shown in FIG. 2, the cover 2 is formed with a cavity 6 accommodating a transmission 5 of the drive system. The boost connector 3 passes through the cover 2 and extends into the housing 1, and is electrically connected to the electrical connector 7 of the electric motor 4. For example, the boost connector 3 is electrically connected to a winding of the electric motor via the electrical connector 7, and then electrically connected to an inverter, a high-voltage power distribution unit (PDU) and an on-board charger (OBC), etc. of the drive system. For example, the boost connector 3 can boost power from a 400 V charging device to 800 V, to charge a battery of the vehicle.

Thus, the boost connector of the present disclosure is installed at the drive end of the electric motor, closer to the electrical connector of the electric motor, thus making the structure more compact.

Figure 2:
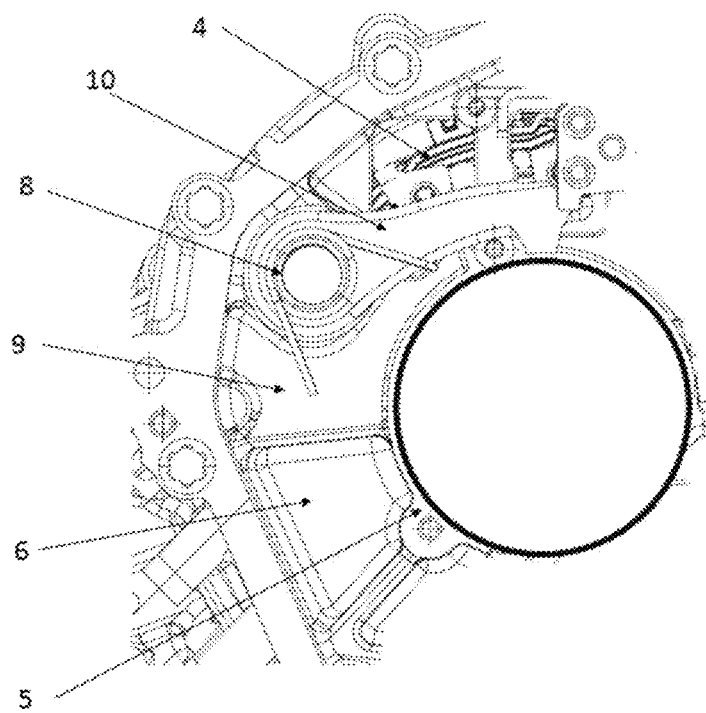
FIG. 2 shows a schematic drawing of an end of a drive system according to an embodiment of the present disclosure.

As shown in FIG. 2, the drive system further comprises a positioning shaft 8 for positioning a pawl 10 of a parking lock mechanism of the transmission 5, the positioning shaft 8 being fixed to a drive end wall 9 of the housing 1, and the pawl 10 being rotatable around the positioning shaft 8. The positioning shaft 8 is hollow and extends through the drive end wall 9 of the housing 1. The boost connector 3 extends from one end of the hollow positioning shaft through the positioning shaft into the housing.

In this way, the present disclosure can use an existing structure to install the boost connector, so saves space and simplifies installation; moreover, the hollow shaft can be used to provide protection for the boost connector, thus improving reliability. In addition, this type of installation has little impact on the layout of the existing structure; in particular, it has no impact at all on the layout of the parking lock mechanism of the transmission.

Specifically, the installation of boost connectors of different sizes can be achieved by choosing the inner diameter of the hollow positioning shaft. For example, there is an option to suitably increase the inner diameter of the hollow positioning shaft to ensure that the boost connector passes through.

Figure 3:
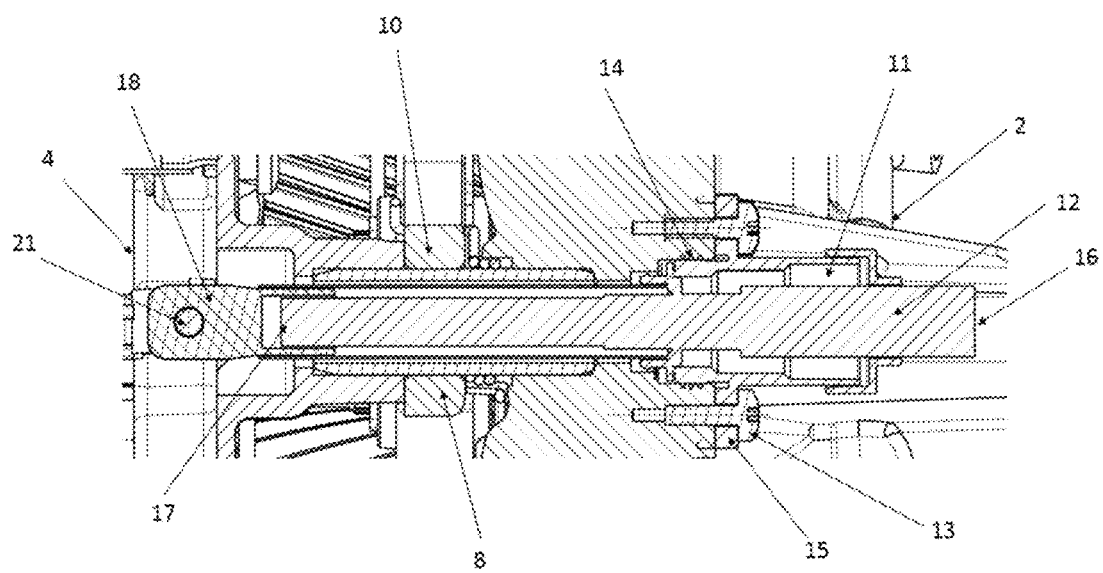
FIG. 3 shows a sectional schematic drawing of part of a drive system according to an embodiment of the present disclosure.

As shown in FIG. 3, the boost connector 3 comprises a connection seat 11 and a cable 12 fixed to the connection seat 11; the connection seat 11 is fixed to the cover 2 by a first fastener 13, and the cable 12 extends through the connection seat 11. The cable 12 may pass through a hole in the connection seat 11 and be fixed in the hole. By means of the connection seat 11, the boost connector can be fixed to a transmission cover (i.e. the cover 2 in the present disclosure), and a certain degree of protection can be provided for the cable.

As shown in FIG. 3, the cover 2 is provided with an installation hole, the connection seat 11 being fixed in the installation hole, and a first sealing member 14 is arranged between the connection seat 11 and a hole wall of the installation hole. The first sealing member 14 comprises multiple sealing rings distributed in an extension direction of the cable 12. The first sealing member may be made of rubber or silicone rubber. In this way, a good sealing effect can be achieved, and the extension of the boost connector through the cover and the housing from the electric motor drive side will not affect the sealing of the drive system.

As shown in FIG. 3, the connection seat 11 may comprise a flange 15, the first fastener 13 passing through the flange 15 and being fixed to the cover 2. For example, the first fastener 13 may be a bolt, a screw, etc.

A first end 16 of the cable 12 may be electrically connected to a power source, such as an external charging station. As shown in FIGS. 1 and 3, a second end 17 of the cable 12 extends into the housing 1 and is electrically connected to the electrical connector 7 of the electric motor 4 via a wiring terminal 18.

Again referring to FIG. 1, an installation window 20 is provided on a peripheral side wall 19 of the housing 1; through the installation window 20, a second fastener 21 is used to fix the wiring terminal 18 to the electrical connector 7. For example, the second fastener 21 may be a bolt, a screw, etc.

To facilitate installation, the drive system further comprises an installation cover for closing the installation window 20, but this is not shown in the figures. The drive system further comprises a second sealing member which is not shown in the figures, the second sealing member being arranged between the installation cover and the installation window 20; the housing 1 is thus sealed by the second sealing member and the installation cover together. The second sealing member may be made of rubber or silicone rubber.

The boost connector of the drive system described above is arranged at the drive end of the electric motor, extends through the transmission cover and the electric motor housing and is installed using the pawl positioning shaft of the parking lock mechanism; such a drive system is structurally compact, convenient to install, well-sealed and highly reliable.

A vehicle of the present disclosure comprises the drive system described above. The vehicle may be an electrified vehicle, for example, a battery electric vehicle (BEV), a hybrid electric vehicle (HEV), a plug-in hybrid electric vehicle (PHEV), a range-extended EV, or a fuel cell electric vehicle (FCEV). The vehicle may also be a hydrogen-powered vehicle. It should be understood that the vehicle of the present disclosure also has the advantages described above in relation to the drive system.

In addition, the technical features disclosed above are not limited to combinations of the disclosed features with other features, and those skilled in the art could combine technical features in other ways according to the objective of the invention, to realize the objective of the present disclosure.

The invention claimed is:

1. A drive system for a vehicle, wherein the drive system comprises:
   a housing, in which an electric motor of the drive system is provided;
   a cover, which is attached to the housing and forms a cavity accommodating a transmission of the drive system;
   a boost connector, which extends through the cover and into an interior of the housing, and is electrically connected to an electrical connector of the electric motor; and
   a positioning shaft for positioning a pawl of a parking lock mechanism of a transmission, the positioning shaft being hollow and extending through a drive end wall of the housing, wherein the boost connector extends from one end of the positioning shaft through the positioning shaft to the interior of the housing.

2. The drive system according to claim 1, wherein the boost connector comprises a connection seat and a cable fixed to the connection seat, the connection seat being fixed to the cover by a first fastener, and the cable extending through the connection seat.

3. The drive system according to claim 2, wherein an installation hole is provided on the cover, the connection seat is fixed in the installation hole, and a first sealing member is provided between the connection seat and a hole wall of the installation hole.

4. The drive system according to claim 3, wherein the first sealing member comprises a plurality of sealing rings distributed along an extension direction of the cable.

5. The drive system according to claim 2, wherein the connection seat comprises a flange through which the first fastener is fixed to the cover.

6. The drive system according to claim 2, wherein a first end of the cable is electrically connected to a power source, and a second end extends into the housing and is electrically connected to the electrical connector of the electric motor via a wiring terminal.

7. The drive system according to claim 6, wherein an installation window is provided on a peripheral side wall of the housing, and a second fastener is used to fix the wiring terminal to the electrical connector through the installation window.

8. The drive system according to claim 7, wherein the drive system further comprises an installation cover for closing the installation window.

9. The drive system according to claim 8, wherein the drive system further comprises a second sealing member which is provided between the installation cover and the installation window.

10. A vehicle, wherein the vehicle comprises the drive system according to claim 1.

11. A vehicle, wherein the vehicle comprises the drive system according to claim 2.

12. A vehicle, wherein the vehicle comprises the drive system according to claim 3.

13. A vehicle, wherein the vehicle comprises the drive system according to claim 4.

14. A vehicle, wherein the vehicle comprises the drive system according to claim 5.

15. A vehicle, wherein the vehicle comprises the drive system according to claim 6.

16. A vehicle, wherein the vehicle comprises the drive system according to claim 7.

17. A vehicle, wherein the vehicle comprises the drive system according to claim 8.

18. A vehicle, wherein the vehicle comprises the drive system according to claim 9.

* * * * *